(12) United States Patent
Jin

(10) Patent No.: US 8,260,106 B2
(45) Date of Patent: Sep. 4, 2012

(54) SEALED OPTOELECTRONIC ISOLATION CONNECTION DEVICE AND SEALED CABIN

(75) Inventor: Ge Jin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/447,020

(22) Filed: Apr. 13, 2012

(65) Prior Publication Data

US 2012/0195566 A1 Aug. 2, 2012

Related U.S. Application Data

(63) Continuation of application No. PCT/CN2011/074216, filed on May 18, 2011.

(30) Foreign Application Priority Data

May 25, 2010 (CN) .......................... 2010 1 0192683

(51) Int. Cl.
G02B 6/00 (2006.01)
G02B 6/44 (2006.01)
G02B 6/50 (2006.01)

(52) U.S. Cl. ...................................... 385/138

(58) Field of Classification Search ................... 385/138
See application file for complete search history.

(56) References Cited

U.S. PATENT DOCUMENTS

| | | | | |
|---|---|---|---|---|
| 4,295,707 A * | 10/1981 | Nakai et al. | ................... | 385/101 |
| 4,296,996 A | 10/1981 | Niiro et al. | | |
| 4,505,540 A | 3/1985 | Furusawa et al. | | |
| 4,544,233 A * | 10/1985 | Iwamoto et al. | ................. | 385/55 |
| 4,653,846 A | 3/1987 | Yamazaki et al. | | |
| 4,834,479 A * | 5/1989 | Adl | ................................ | 385/138 |
| 5,113,475 A * | 5/1992 | Baker | ............................ | 385/138 |
| 7,526,175 B2 * | 4/2009 | Sumitani | ........................ | 385/138 |
| 2003/0228783 A1 | 12/2003 | Cairns et al. | | |
| 2007/0292097 A1 | 12/2007 | Sumitani | | |

FOREIGN PATENT DOCUMENTS

| | | |
|---|---|---|
| CN | 201008040 Y | 1/2008 |
| CN | 101263635 A | 9/2008 |
| CN | 101832427 A | 9/2010 |
| EP | 1521108 A1 | 4/2005 |
| JP | 5064340 A | 3/1993 |
| JP | 9133817 A | 5/1997 |

OTHER PUBLICATIONS

International search report for International application No. PCT/CN2011/074216, dated Aug. 25, 2011, and the translation thereof, total 18 pages.
European Search Report for European Patent Application No. 11167270.5, dated Sep. 15, 2011, total 5 pages.

* cited by examiner

*Primary Examiner* — Michelle R Connelly

(57) ABSTRACT

The present invention provides a sealed optoelectronic isolation connection device which comprises an insulation cylinder, an optical fiber sealing device, and a conduit sealing device; the insulation cylinder is configured to insulate the conduit sealing device and the optical fiber sealing device; the conduit sealing device is provided with a conduit hole, which is configured to accommodate a conduit of an optical cable and sealing the conduit; the optical fiber sealing device is provided with multiple optical fiber holes, which are configured to accommodate optical fibers of the optical cable and sealing the optical fibers; and the optical fiber sealing device and the conduit sealing device are inserted in sequence into the insulation cylinder and seal the insulation cylinder. The device enhances the reliability of the sealed optoelectronic isolation connection device.

10 Claims, 11 Drawing Sheets

271

SEALED OPTOELECTRONIC ISOLATION CONNECTION DEVICE AND SEALED CABIN

CROSS-REFERENCE TO RELATED APPLICATIONS

This application is a continuation of International Application No. PCT/CN2011/074216, filed on May 18, 2011, which claims priority to Chinese Patent Application No. 201010192683.7, filed on May 25, 2010, both of which are hereby incorporated by reference in their entireties.

FIELD OF THE INVENTION

The present invention relates to the technical field of electronics, and in particular, to a sealed optoelectronic isolation connection device and a sealed cabin.

BACKGROUND OF THE INVENTION

At present, with high transmission efficiency, the optical cable is widely used in the communication industry. As required by information transmission, submarine optical fiber cables need to be installed in some application scenarios. Usually it is necessary to connect an optical cable operating in the submarine environment to an electronic device in a sealed cabin via a sealed optoelectronic isolation connection device. The sealed optoelectronic isolation connection device is a connection component for the entry of the optical cable into the sealed cabin, is installed on the outer wall of the sealed cabin, and the outer part of the sealed optoelectronic isolation connection device directly contacts the seawater. After passing through the sealed optoelectronic isolation connection device, the optical cable can connect to the electronic device in the sealed cabin. By sealing the sealed cabin using the sealed optoelectronic isolation connection device, damages that may be made by high-pressure seawater to the connection between the optical cable and the electronic device can be prevented.

FIG. 11 is a schematic diagram illustrating assembling of an optical cable, a sealed optoelectronic isolation connection device, and a sealed cabin in prior art. As shown in FIG. 11, for a sealed optoelectronic isolation connection device 102 in prior art, the surface of an optical cable 101 is often peeled to expose the conduit (for example, copper conduit or aluminum conduit) for transmitting electric signals in the optical cable. Then, the conduit along with the optical fiber in the conductive conduit is inserted into a through hole 1021 provided in the sealed optoelectronic isolation connection device 102, and the connection part between the conduit and the through hole is sealed. Finally, the conduit and the optical fiber are connected to an electronic device in the sealed cabin 103, and the sealed optoelectronic isolation connection device 102 is sealed onto the sealed cabin 103.

In the process of implementing the present invention, the inventor finds that the sealed optoelectronic isolation connection device in prior art only seals the copper conduit of the optical cable. When the copper conduit outside the sealed optoelectronic isolation connection device breaks, the seawater will enter into the sealed cabin along the optical fiber in the conduit and damage the electronic device in the sealed cabin. Therefore, the reliability of the sealed optoelectronic isolation connection device in the prior art is low.

SUMMARY OF THE INVENTION

The present invention provides a sealed optoelectronic isolation connection device and a sealed cabin to overcome the defect that the reliability of the sealed optoelectronic isolation connection device in the prior art is low, and enhance the reliability of the sealed optoelectronic isolation connection device.

The present invention provides a sealed optoelectronic isolation connection device, which includes: an insulation cylinder, a conduit sealing device, and an optical fiber sealing device, where the insulation cylinder is configured to insulate the conduit sealing device and the optical fiber sealing device; the conduit sealing device is provided with a conduit hole, which is configured to accommodate a conduit of the optical cable and seal the conduit; the optical fiber sealing device is provided with multiple optical fiber holes, which are configured to accommodate optical fibers of the optical cable and seal the optical fibers; and the optical fiber sealing device and the conduit sealing device are inserted in sequence into the insulation cylinder and implement sealing together with the insulation cylinder.

The present invention provides a sealed cabin, which includes a sealed cabin main body, and the sealed optoelectronic isolation connection device as described above, where the sealed optoelectronic isolation connection device is fixed to the sealed cabin main body.

The sealed optoelectronic isolation connection device and the sealed cabin provided in the present invention seal each optical fiber of the optical cable through the optical fiber sealing device, and seal the conduit of the optical cable through the conduit sealing device, thereby separately sealing the optical fibers and the conduit of the optical cable through the sealed optoelectronic isolation connection device. When the conduit of the optical cable breaks, since the optical fibers are sealed by the optical fiber sealing device, the seawater will not enter along the optical fibers into the inner part of the sealed cabin sealed by the sealed optoelectronic isolation connection device after the seawater enters into the conduit. This effectively prevents the electronic devices inside the sealed cabin from being damaged. Therefore, the reliability of the sealed optoelectronic isolation connection device is enhanced.

BRIEF DESCRIPTION OF THE DRAWINGS

To more clearly illustrate the embodiments of the present invention or the technical solutions in the prior art, the following briefly describes the accompanying drawings to be used in describing the embodiments and the prior art. Obviously, the accompanying drawings are merely some embodiments of the present invention. For those of ordinary skill in the art, other accompanying drawings may be obtained without creative efforts according to these accompanying drawings.

DETAILED DESCRIPTION OF THE EMBODIMENTS

To make the objectives, technical solutions, and advantages of embodiments of the present invention more clear, the following describes the technical solutions provided in embodiments of the present invention clearly and with reference to the accompanying drawings. Obviously, the embodiments as shown are only a part, but not all, of the embodiments of the present invention. All other embodiments made by those of ordinary skill in the art according to the embodiments of the present invention herein without creative efforts shall fall within the scope of the present invention.

Figure 1:
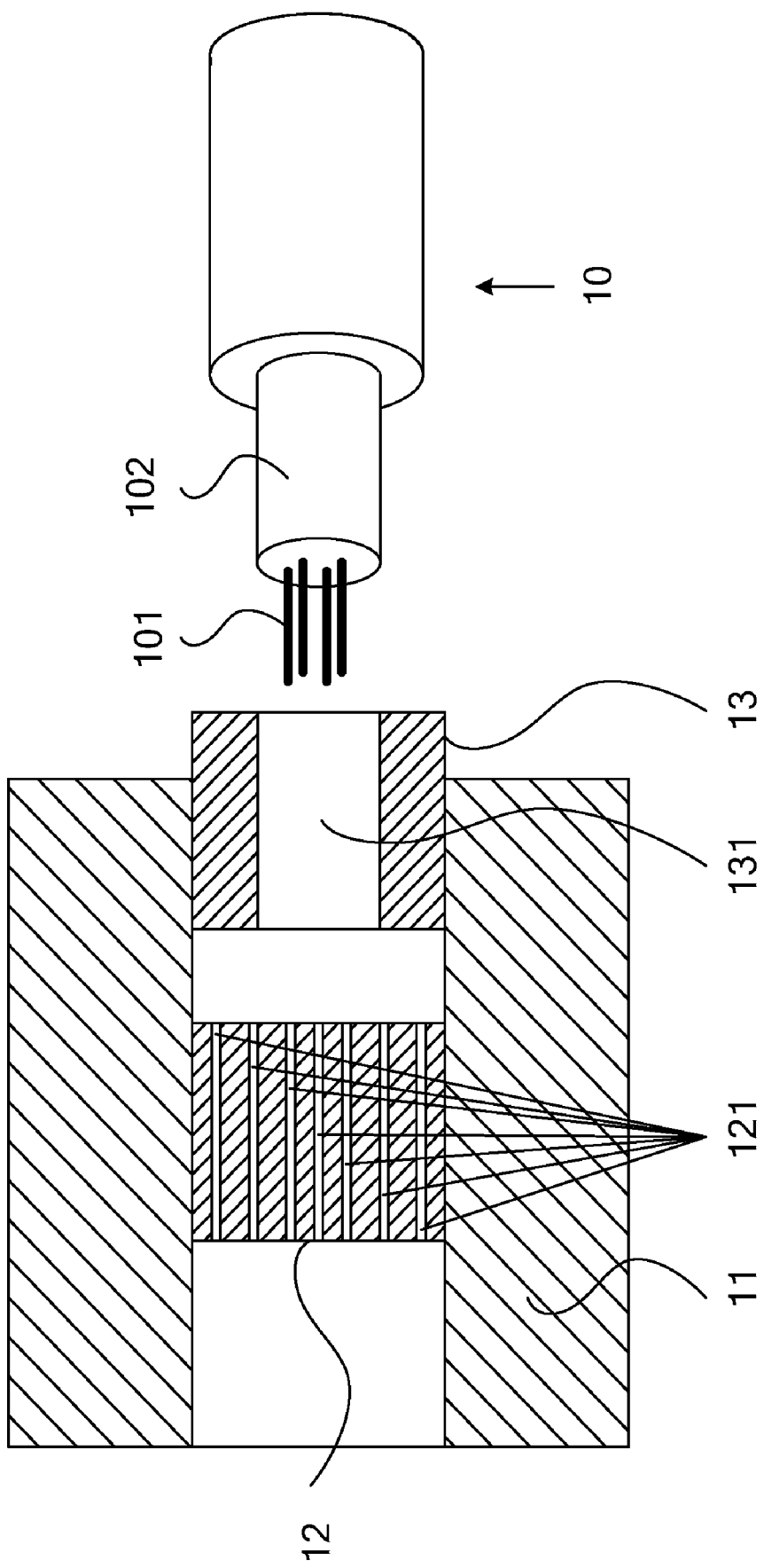
FIG. 1 is a schematic diagram depicting a structure of the section of a sealed optoelectronic isolation connection device according to a first embodiment of the present invention.

FIG. 1 is a schematic diagram depicting a structure of the section of a sealed optoelectronic isolation connection device according to a first embodiment the present invention. As shown in FIG. 1, the sealed optoelectronic isolation connection device according to this embodiment includes an insulation cylinder 11, an optical fiber sealing device 12, and a conduit sealing device 13.

In this embodiment, the insulation cylinder 11 may be a cylindrical structure with a through hole, and is configured to insulate the conduit sealing device 13 and the optical fiber sealing device 12.

The optical fiber sealing device 12 is provided with multiple optical fiber holes 121, where the optical fiber holes 121 are configured to accommodate multiple optical fibers 101 of an optical cable 10 and seal the optical fibers 101.

The conduit sealing device 13 is provided with a conduit hole 131, which is configured to accommodate the conduit 102 (such as a copper or aluminum conduit) of the optical cable and seal the conduit 102. The optical fiber sealing device 12 and the conduit sealing device 13 are inserted in sequence into the insulation cylinder 11 and implement sealing together with the insulation cylinder 11.

Specifically, the optical fiber sealing device 12 in the sealed optoelectronic isolation connection device according to this embodiment is configured to seal the optical fibers 101 of the optical cable 10. Each optical fiber 101 of the optical cable 10 is inserted into an optical fiber hole 121 in the optical fiber sealing device 12. In this way, each optical fiber 101 of the optical cable 10 can be sealed by each optical fiber hole 121. In addition, the conduit sealing device 13 provided in this embodiment is configured to seal the conduit 102 of the optical cable 10. The conduit sealing device 13 is located on one side of the optical fiber holes 121 in the optical fiber sealing device. The conduit 102 of the optical cable 10 is inserted into the conduit hole 131 in the conduit sealing device 13, and therefore, the conduit 102 of the optical cable 10 can be sealed by the conduit hole 131. The optical fiber sealing device 12 and the conduit sealing device 13 according to this embodiment are inserted in sequence into the insulation cylinder 11 and implement sealing together with the insulation cylinder 11. In this way, by hermetically assembling the insulation cylinder 11 onto sealed devices such as the sealed cabin, hermetically connecting the optical cable 10 to an electronic device within a sealed device can be realized. In actual practice, the optical cable 10 passes through in sequence the conduit sealing device 13 and the optical fiber sealing device 12, making the conduit 102 of the optical cable 10 sealed by the conduit sealing device 13, and each optical fiber 101 of the optical cable 10 sealed by the optical fiber sealing device 13.

The sealed optoelectronic isolation connection device and the sealed cabin provided in the present invention seal each optical fiber of the optical cable through the optical fiber sealing device, and seal the conduit of the optical cable through the conduit sealing device, thereby separately sealing the optical fibers and the conduit of the optical cable through the sealed optoelectronic isolation connection device. When the conduit of the optical cable breaks, since the optical fibers are sealed by the optical fiber sealing device, the seawater will not enter along the optical fibers into the inner part of the sealed cabin sealed by the sealed optoelectronic isolation connection device after the seawater enters into the conduit. This effectively prevents the electronic device inside the sealed cabin from being damaged. Therefore, the reliability of the sealed optoelectronic isolation connection device is enhanced.

Figure 2:
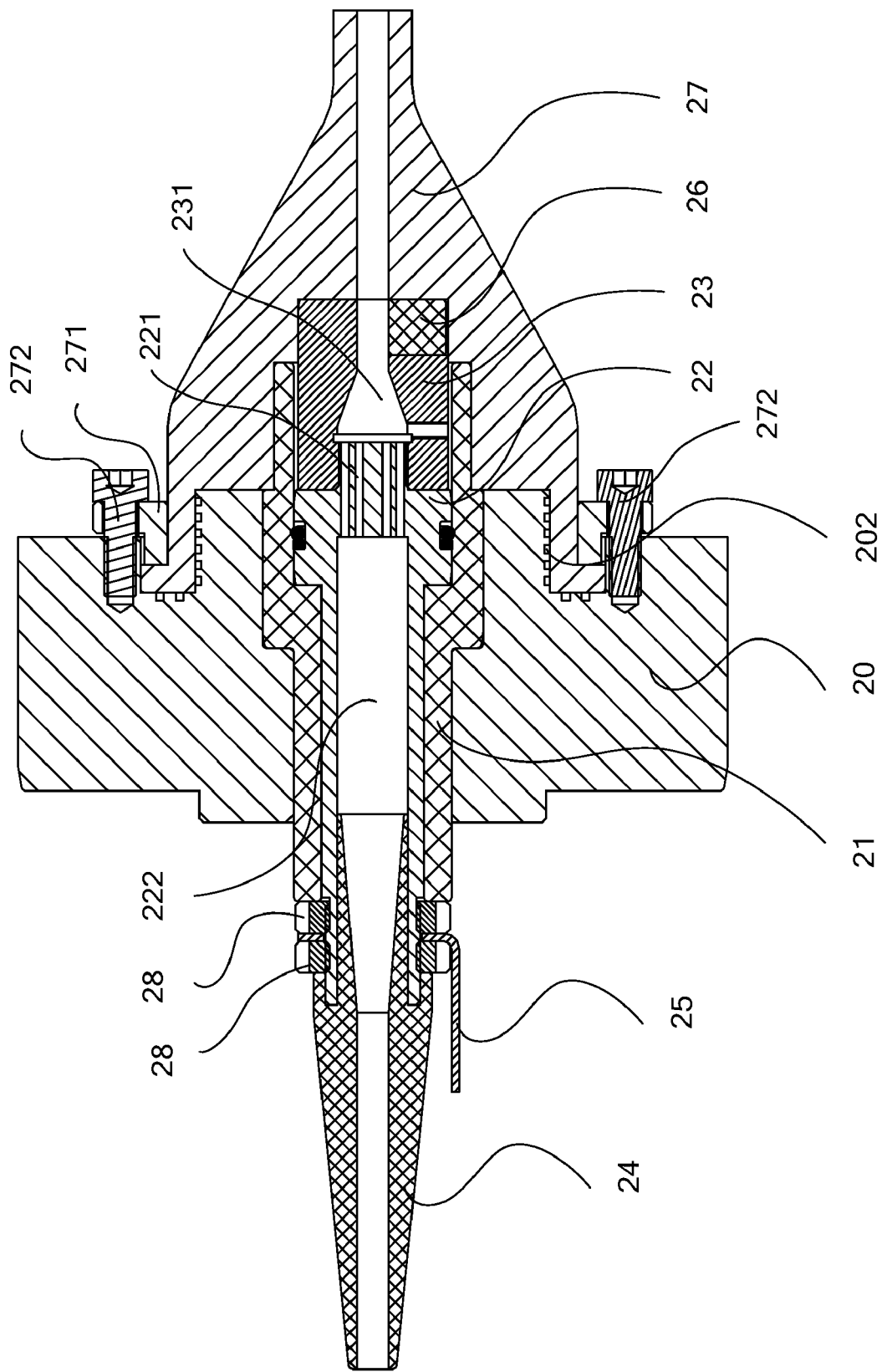
FIG. 2 is a schematic diagram depicting a structure of a sealed optoelectronic isolation connection device according to a second embodiment of the present invention.

FIG. 2 is a schematic diagram depicting a structure of a sealed optoelectronic isolation connection device according to a second embodiment of the present invention. As shown in FIG. 2, the sealed optoelectronic isolation connection device according to this embodiment, based on the above sealed optoelectronic isolation connection device provided in the first embodiment, includes an insulation cylinder 21, a conduit sealing device 23, and an optical fiber sealing device 22. In addition, the device according to this embodiment of the invention further includes a base bushing 20.

The insulation cylinder 21 is inserted into the base bushing 20 and implements sealing together with the base bushing 20. In this way, through the base bushing 20, the sealed optoelectronic isolation connection device provided in this embodiment is readily assembled to a sealing device such as a sealing cabin, which makes it more convenient to securely assemble the sealed optoelectronic isolation connection device provided in this embodiment.

Figure 3:
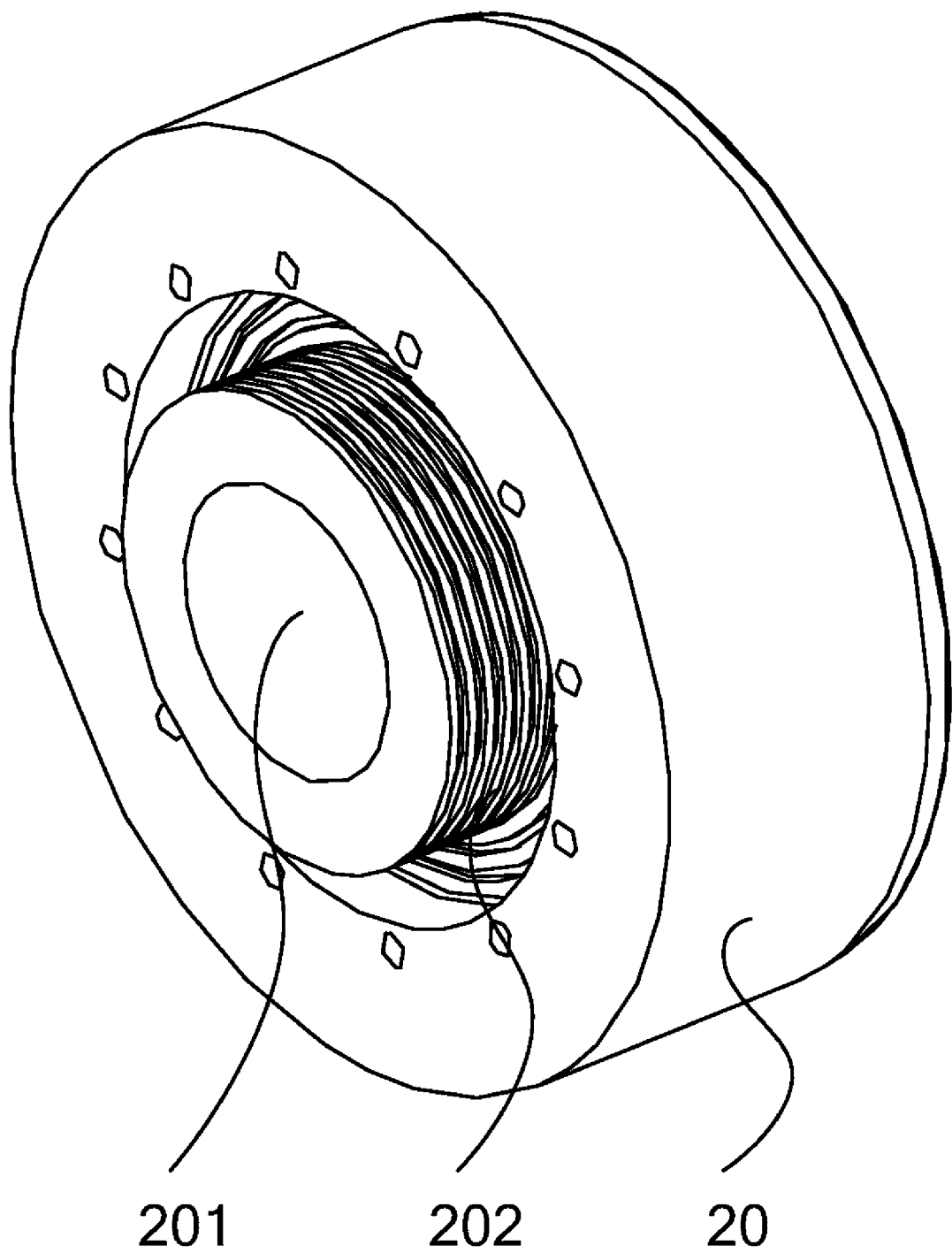
FIG. 3 is a schematic diagram depicting a structure of a base bushing in the sealed optoelectronic isolation connection device according to the second embodiment of the present invention.

FIG. 3 is a schematic diagram depicting a structure of the base bushing in the sealed optoelectronic isolation connection device according to the second embodiment of the present invention. Further, as shown in FIG. 3, it is a schematic diagram depicting the 3-D structure of the base bushing 20 according to this embodiment of the present invention. The base bushing 20 according to this embodiment is provided with a first stepped hole 201 and multiple annular grooves 202, where the first stepped hole 201 is used for connection with the insulation cylinder 21.

Figure 4:
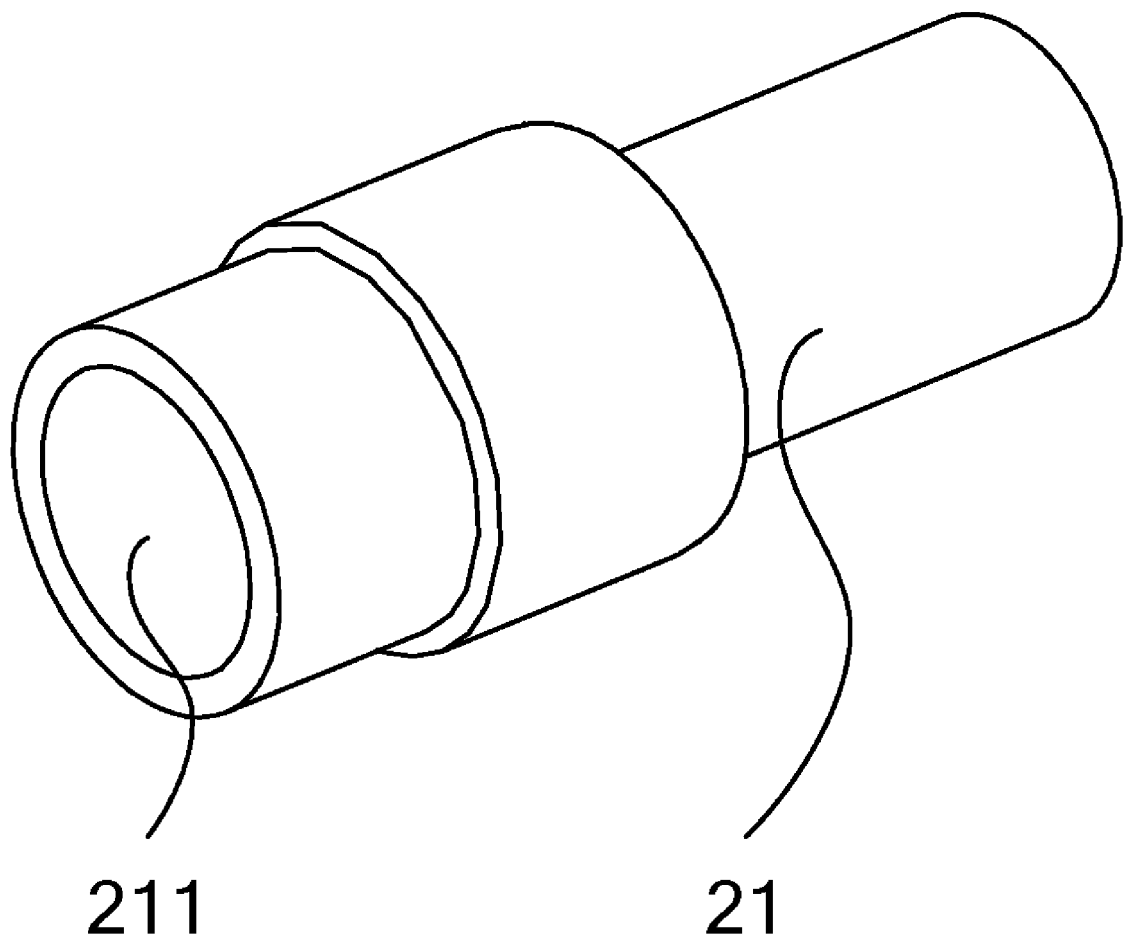
FIG. 4 is a schematic diagram depicting a structure of an insulation cylinder in the sealed optoelectronic isolation connection device according to the second embodiment of the present invention.

FIG. 4 is a schematic diagram depicting a structure of the insulation cylinder in the sealed optoelectronic isolation connection device according to the second embodiment of the present invention. Referring to FIG. 4, it is a schematic diagram depicting a 3D structure of the insulation cylinder 21. The insulation cylinder 21 according to this embodiment has a stepped structure. The insulation cylinder 21 is inserted into the first stepped hole 201. The insulation cylinder 21 further includes a second stepped hole 211 for connection with the optical fiber sealing device 22 and the conduit sealing device 23.

Figure 5:
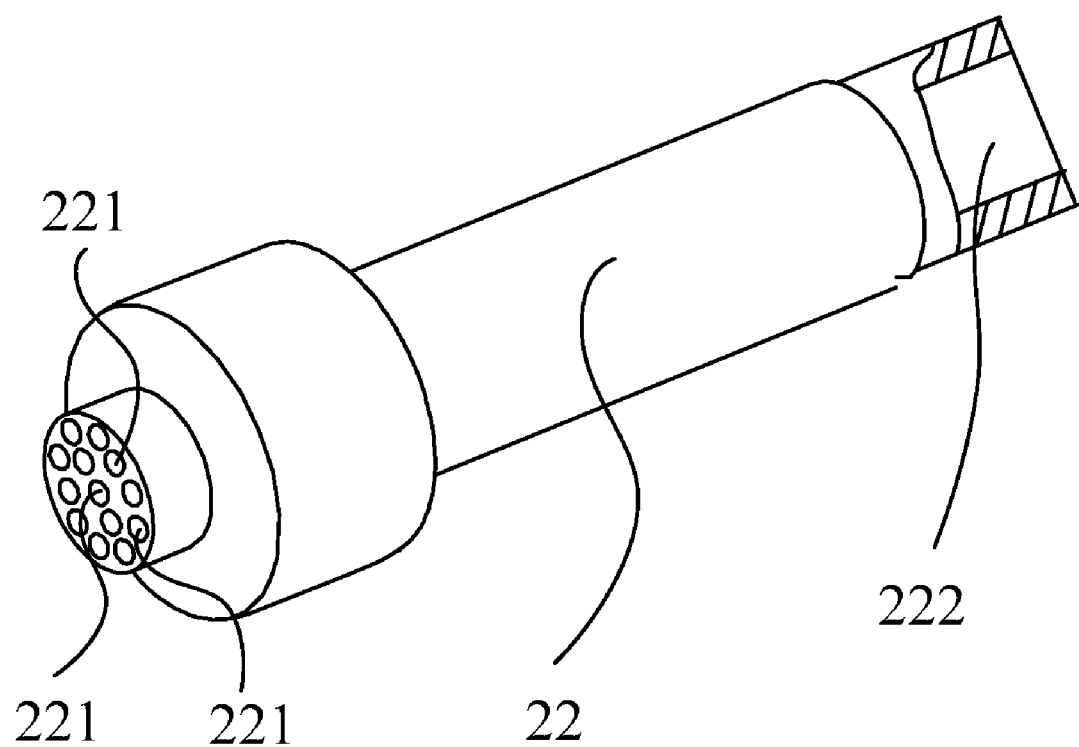
FIG. 5 is a schematic diagram depicting a structure of an optical fiber sealing device in the sealed optoelectronic isolation connection device according to the second embodiment of the present invention.

FIG. 5 is a schematic diagram depicting a structure of the optical fiber sealing device in the sealed optoelectronic isolation connection device according to the second embodiment of the present invention. Referring to FIG. 5, it is a schematic diagram depicting a 3D structure of the optical fiber sealing device 22. The optical fiber sealing device 22 is a stepped cylinder. There are multiple optical fiber holes 221 provided on one end of the stepped cylinder. There is a through hole 222 provided on the other end of the stepped cylinder. The through hole 222 is interconnected with the optical fiber holes 221.

In this embodiment of the invention, the conduit sealing device 23 and the optical fiber sealing device 22 are inserted in sequence into the second stepped hole 211. Specifically, to reliably and securely connect all components of the sealed optoelectronic isolation connection device of the present invention to each other, each component in this embodiment has a stepped structure. The insulation cylinder 21 is inserted into the first stepped hole 201 of the base bushing 20, so that the stepped structure of the insulation cylinder 21 can be matched with the stepped structure of the first stepped hole 201, making the insulation cylinder 21 be fixed in the base bushing 20. In addition, the optical fiber sealing device 22 is a stepped cylinder, one end of which is provided with optical fiber holes 221, and the other end of which is provided with a through hole 222. The optical fiber holes 221 are interconnected with the through hole 222, so that all optical fibers of the optical cable are aggregated in the through hole 222 after the optical fibers pass through the optical fiber hole 221, making it convenient for the optical fibers passing through the optical fiber sealing device 22 to connect to other devices. Finally, the optical fiber sealing device 22 and the conduit sealing device 23 are inserted in sequence into the second stepped hole 211, and the stepped structure of the optical fiber sealing device 22 is matched with the second stepped hole 211, so that the optical fiber sealing device 22 and the conduit sealing device 23 are securely fixed in the insulation cylinder 21.

To conveniently insert the optical fiber sealing device 22 and the conduit sealing device 23 into the second stepped hole 211, the end of the optical fiber sealing device 22 on which the optical fiber holes 221 are provided, is threadedly connected to the conduit sealing device. Specifically, the end of the optical fiber sealing device 22 on which the optical fiber holes 221 are provided can be configured with screw threads, and the conduit sealing device 23 can be configured with a threaded hole, so that the optical fiber sealing device 22 and the conduit sealing device 23 can be threadedly connected to each other, which makes it convenient to insert the optical fiber sealing device 22 along with the conduit sealing device 23 into the second stepped hole 211. Further, since the optical fiber sealing device 22 and the conduit sealing device are threadedly connected to each other, the connection part between them is more hermetic, making it more conducive to enhancing the reliability of the sealed optoelectronic isolation connection device provided in this embodiment.

In addition, the optical fiber sealing device 22 according to this embodiment extends beyond the end of the insulation cylinder 21 so that the optical fiber sealing device 22 can be threadedly connected to screw nuts 28, which lean against the insulation cylinder 21. Specifically, after matching the outer stepped structure of the optical fiber sealing device 22 with the second stepped hole 211, the optical fiber sealing device 22 is securely fixed to the insulation cylinder 21 through the screw nuts 28, so that the insulation cylinder 21, the optical fiber sealing device 22, and the conduit sealing device 23 are first assembled, and then they are placed into the base bushing 20. This can effectively simplify the process of assembling the sealed optoelectronic isolation connection device according to this embodiment.

In the sealed optoelectronic isolation connection device according to this embodiment, by providing a base bushing and inserting the insulation cylinder into the base bushing, the sealed optoelectronic isolation connection device according to this embodiment can be more readily assembled onto a sealed device such as a sealed cabin, so that the sealed optoelectronic isolation connection device according to this embodiment can be more readily and securely assembled and used. By configuring all components in the embodiment as a stepped structure, all components can be more accurately and securely assembled. In addition, by threadedly connecting the optical fiber sealing device to the conduit sealing device, the optical fiber sealing device and the conduit sealing device can be more readily assembled into the insulation cylinder, and the connection part between the optical fiber sealing device and the conduit sealing device is more hermetical, which more effectively enhances the reliability of the sealed optoelectronic isolation connection device provided in this embodiment.

Based on the above technical solutions, optionally, referring to FIG. 2, the sealed optoelectronic isolation connection device according to this embodiment further includes a curved protective casing 24. The curved protective casing 24 is inserted into the through hole 222 of the optical fiber sealing device 22, and is configured to enclose the outer part of the optical fibers passing through the optical fiber sealing device 22.

Figure 7:
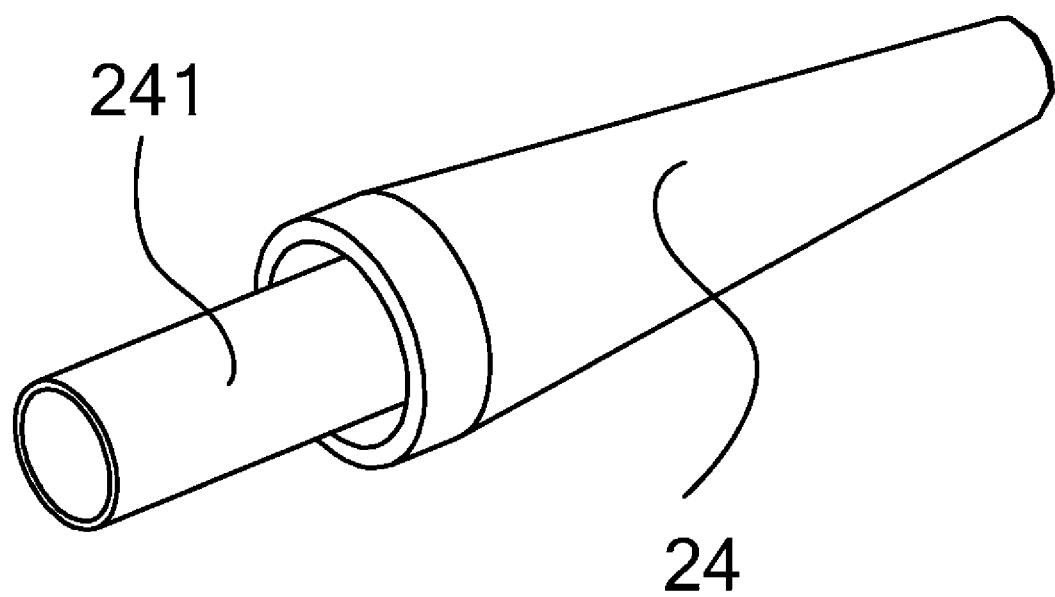
FIG. 7 is a schematic diagram depicting a structure of a curved protective casing in the sealed optoelectronic isolation connection device according to the second embodiment of the present invention.

FIG. 7 is a schematic diagram depicting a structure of a curved protective casing in the sealed optoelectronic isolation connection device according to the second embodiment of the present invention. Referring to FIG. 7, it is a schematic diagram depicting a 3D structure of the curved protective casing 24 according to this embodiment. An end 241 of the curved protective casing 24 is inserted into the through hole 222 of the optical fiber sealing 22. The curved protective casing 24 encloses the outer part of the optical fibers passing through the optical fiber sealing device 22. This can effectively prevent the optical fibers from being damaged by other components and prevent the optical fibers from being damaged due to an excessive bending angle at the time of assembling the sealed optoelectronic isolation connection device according to this embodiment. Therefore, the optical fibers can be effectively protected.

Further, the optical fiber sealing device 22 can be electrically connected to the conduit sealing device 23 in the present embodiment. Referring to FIG. 2, the sealed optoelectronic isolation connection device according to this embodiment may further include an electrode lead 25. The electrode lead 25 is fixed to an end of the optical fiber sealing device 22 distant from the optical fiber holes 221, and is electrically connected to the optical fiber sealing device 22. The electrode lead 25 is configured to transmit electrical signals transmitted in the conduit (such as a copper conduit) of the optical cable.

Specifically, the optical fibers of the optical cable are used for transmitting optical signals, whereas the conduit of the optical cable is used for transmitting electrical signals. To readily transmit electrical signals transmitted in the conduit through the sealed optoelectronic isolation connection device according to this embodiment, the optical fiber sealing device 22 is electrically connected to the conduit sealing device 23. Moreover, the electrode lead 25 is electrically connected to the optical fiber sealing device 22. This can make the electrical signals transmitted in the conduit of the optical cable pass through in sequence the conduit sealing device 23 and the optical fiber sealing device 22 to the electrode lead 25. In this way, by connecting the electrode lead 25 to the electronic device in a sealed device such as the sealed cabin, transmission of electrical signals to the electronic device can be realized. Therefore, by enabling the electrical signals to pass through in sequence the conduit of the optical cable, the conduit sealing device 23, the optical fiber sealing device 22, and the electrode lead 25, the electrical signals can ultimately be transmitted to the electronic device in a sealed device such as the sealed cabin.

Figure 6:
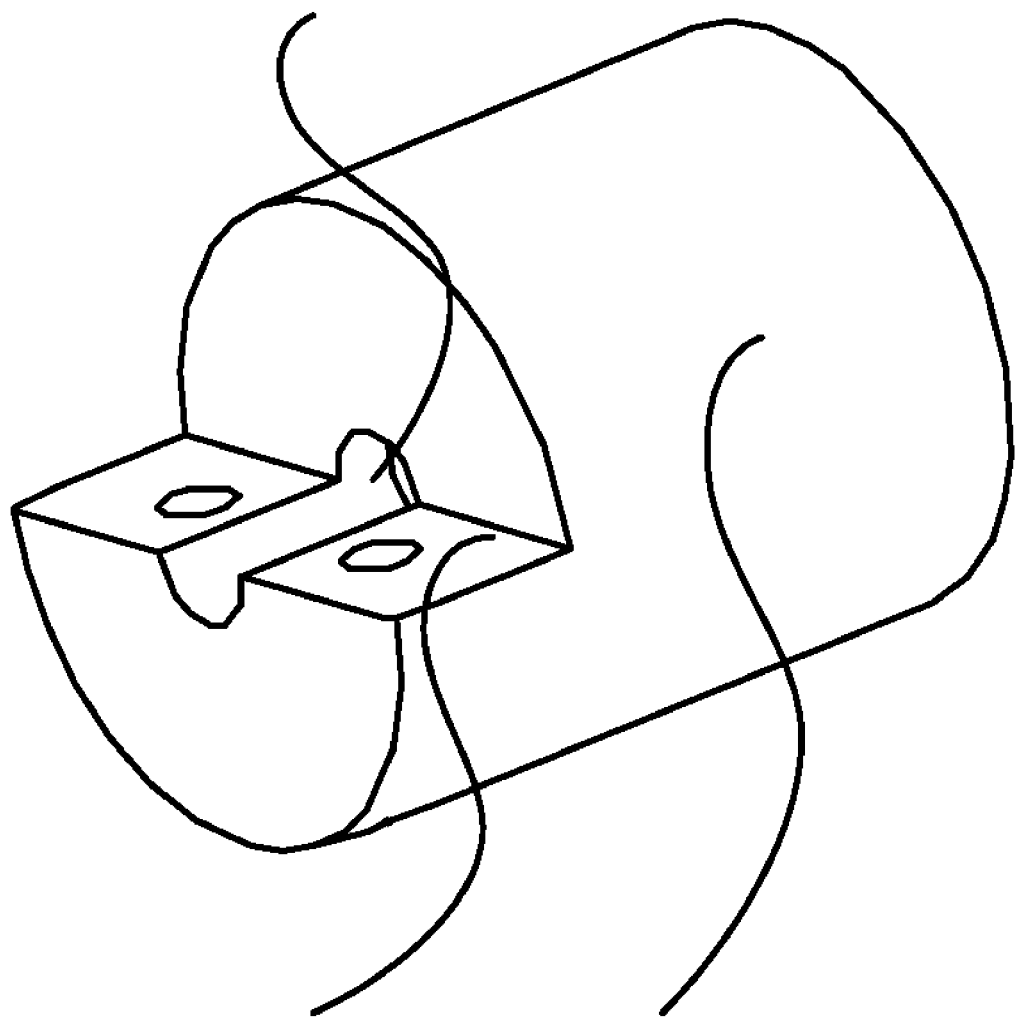
FIG. 6 is a schematic diagram depicting a structure of a conduit sealing device in the sealed optoelectronic isolation connection device according to the second embodiment of the present invention.
Figure 8:
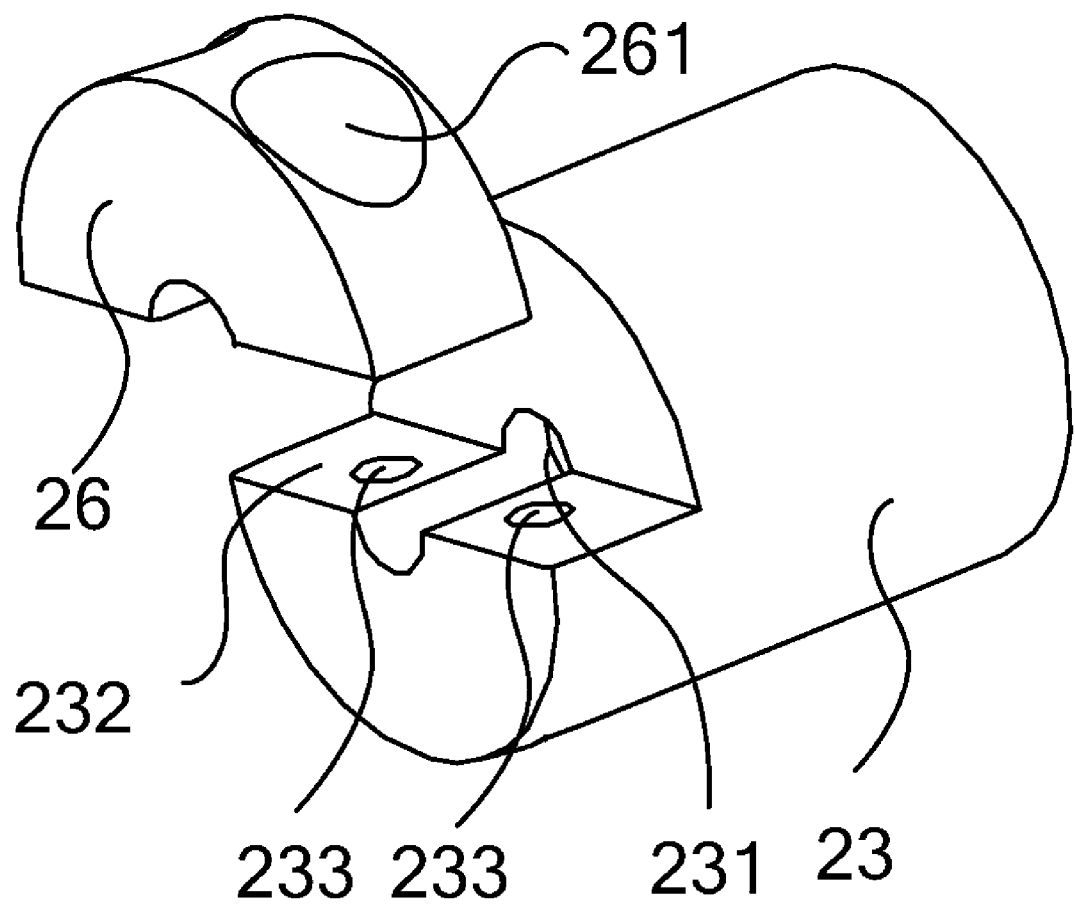
FIG. 8 is a schematic diagram depicting assembly of a locking block and the conduit sealing device in the sealed optoelectronic isolation connection device according to the second embodiment of the present invention.

As shown in FIG. 2, in addition, the sealed optoelectronic isolation connection device according to this embodiment may further include a locking block 26. The locking block 26 is connected to the conduit sealing device 23 via screw bolts (not shown in this figure), and is configured to fix the conduit to the conduit sealing device 23. FIG. 6 is a schematic diagram depicting a structure of the conduit sealing device in the sealed optoelectronic isolation connection device provided in the second embodiment of the present invention. Specifically, referring to FIG. 6, it is a schematic diagram depicting a 3D structure of the conduit sealing device according to this embodiment. The conduit sealing device 23 is provided with a conduit hole 231 and a notch 232. The conduit hole 231 is configured to accommodate the conduit of the optical cable, and the notch 232 is configured to place the locking block 26, to securely fix the conduit of the optical cable to the conduit sealing device 23 through the locking block 26. FIG. 8 is a schematic diagram depicting assembly of the locking block and the conduit sealing device of the sealed optoelectronic isolation connection device provided in the second embodiment of the present invention. Specifically, referring to FIG. 8, it is a schematic diagram depicting assembly of the locking block 26 and the conduit sealing device 23 according to this embodiment. In installation, the locking block 26 is placed at the notch 232, and by inserting screw bolts into installation holes 261 provided on the locking block 26 and threaded holes 233 of the conduit sealing device 23, the screw bolts are made threadedly connected to the threaded holes 233, so that the locking block 26 is fixed onto the conduit sealing device 23. When in use, after the conduit of the optical cable is inserted into the conduit hole 231 of the conduit sealing device 23, by fixing the locking block 26 onto the conduit sealing device 23 through the screw bolts, the conduit is securely fixed onto the conduit sealing device 23 using the locking block 26, thereby preventing the conduit from escaping out of the conduit hole 231. This effectively enhances the reliability of the sealed optoelectronic isolation connection device provided in this embodiment.

By providing the curved protective casing, the sealed optoelectronic isolation connection device according to this embodiment can effectively protect the optical fibers and prevent them from being damaged. By providing the electrode lead, the electrical signals transmitted in the conduit can pass through in sequence the conduit sealing device and the optical fiber sealing device and enter into the electrode lead. Therefore, by connecting the electrode lead to the electronic device in a sealing device such as the sealing cabin, transmission of the electrical signals to the electronic device is realized. By providing the locking block, after inserting the conduit into the conduit hole, the conduit can be securely fixed onto the conduit sealing device through the locking block. In this way, the conduit can be prevented from escaping out of the conduit hole. This effectively enhances the reliability of the sealed optoelectronic isolation connection device provided in this embodiment.

Referring to FIG. 2, based on the above technical solutions, optionally, the sealed optoelectronic isolation connection device according to this embodiment further includes a casted protection layer 27. The casted protection layer 27 is fixed onto an end of the base bushing 20 close to the conduit sealing device 23, and is configured to seal the base bushing 20, after the optical cable is inserted into the sealed optoelectronic isolation connection device according to this embodiment.

Figure 9:
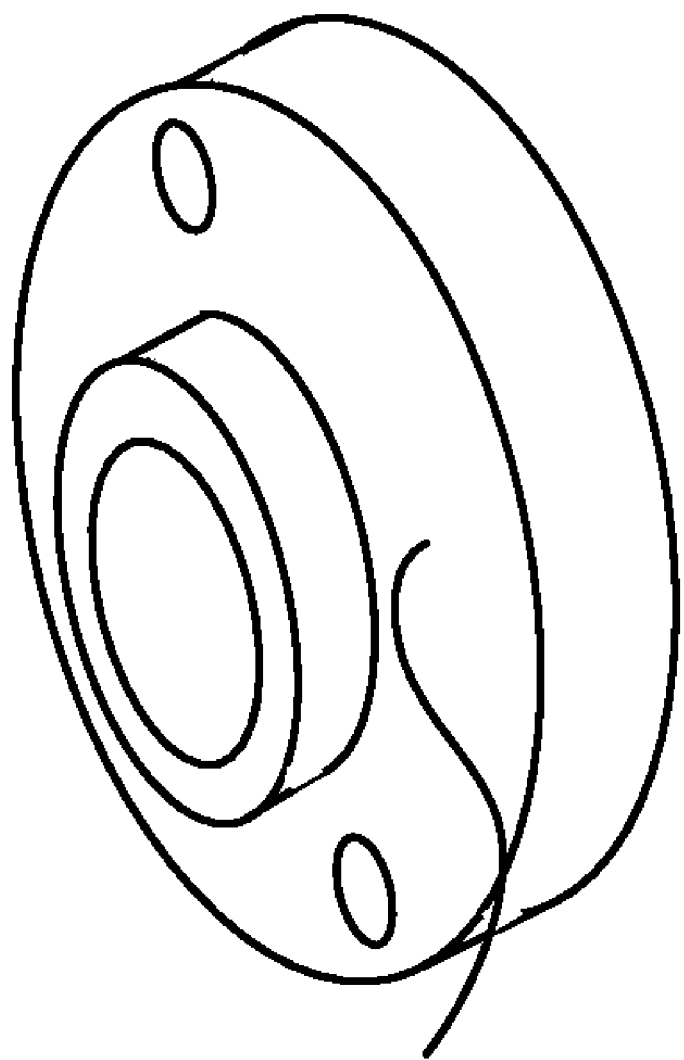
FIG. 9 is a schematic diagram depicting a structure of an external pressure ring in the sealed cabin provided in the present invention.

Specifically, after the optical fibers of the optical cable are inserted into the optical fiber holes 221 and the conduit is inserted into the conduit hole 231, the end of the base bushing 20 according to this embodiment close to the conduit sealing device 23 is fixed with the casted protection layer 27. The casted protection layer 27 can be made of high molecular material such as polyethylene and is fixed onto the base bushing 20 by casting. The casted protection layer 27 can seal the end surface of the base bushing in the optical fiber insertion direction, thereby sealing the optical fiber sealing device 22 and the conduit sealing device 23 in the base bushing 20, and improving the sealing performance of the sealed optoelectronic isolation connection device according to this embodiment. To more securely fix the casted protection layer 27 onto the base bushing 20, multiple annular grooves 202 may be provided on the part where the base bushing 20 and the casted protection layer 27 are connected. By providing annular grooves 202 on the base bushing 20, the casting material can flow into the annular grooves 202 in the process of casting the protection layer 27, enabling the casted protection layer 27 to be more securely fixed onto the base bushing 20. FIG. 9 is a schematic diagram depicting a structure of an external pressure ring in the sealed cabin provided in an embodiment of the present invention. Referring to FIG. 9, the sealed optoelectronic isolation connection device according to this embodiment may further include an external pressure ring 271, which fixedly connects the casted protection layer 27 and the base bushing 20 in sequence via a screw bolt 272. By fixedly connecting in sequence the casted protection layer 27 and the base bushing 20 via the screw bolt, the external pressure ring 271 can more securely fix the casted protection layer 27 to the base bushing 20.

The sealed optoelectronic isolation connection device according to this embodiment, by casting the casted protection layer onto the base bushing after the optical cable is assembled, can seal the end surface of the base bushing in the optical fiber insertion direction through the casted protection layer, so that the optical fiber sealing device and the conduit sealing device are sealed in the base bushing, which enables the sealed optoelectronic isolation connection device according to this embodiment to more securely seal the optical cable, thereby more effectively enhancing the reliability of the sealed optoelectronic isolation connection device provided in this embodiment.

Based on the above technical solution, optionally, the sealed optoelectronic isolation connection device according to this embodiment may have many sealing modes.

Mode 1: sealing via a sealing ring. A sealing ring (not shown in the figures) may be provided between the optical fiber sealing device 22 and the insulation cylinder 21 in this embodiment; and/or a sealing ring may be provided between the conduit sealing device 23 and the insulation cylinder 21; a sealing ring may be provided between the insulation cylinder 21 and the base bushing 20; multiple grooves (not shown in the figures) for placing the sealing rings may be provided outside the base bushing 20. Specifically, by providing sealing rings at each sealed part of the sealed optoelectronic isolation connection device according to this embodiment, all sealed parts can be sealed by the sealing rings.

Mode 2: sealing by welding. The optical fiber sealing device 22 and the conduit sealing device 23 are separately welded to the insulation cylinder 21, and the insulation cylinder 21 is welded to the base bushing 20. Specifically, by welding together each sealed part, each sealed part can be securely sealed.

Mode 3: using both the sealing rings and welding. Specifically, each sealed part in the sealed optoelectronic isolation connection device according to this embodiment can be sealed with a sealing ring, or can be sealed by welding, or can be sealed both through the sealing ring and by welding.

Figure 10:
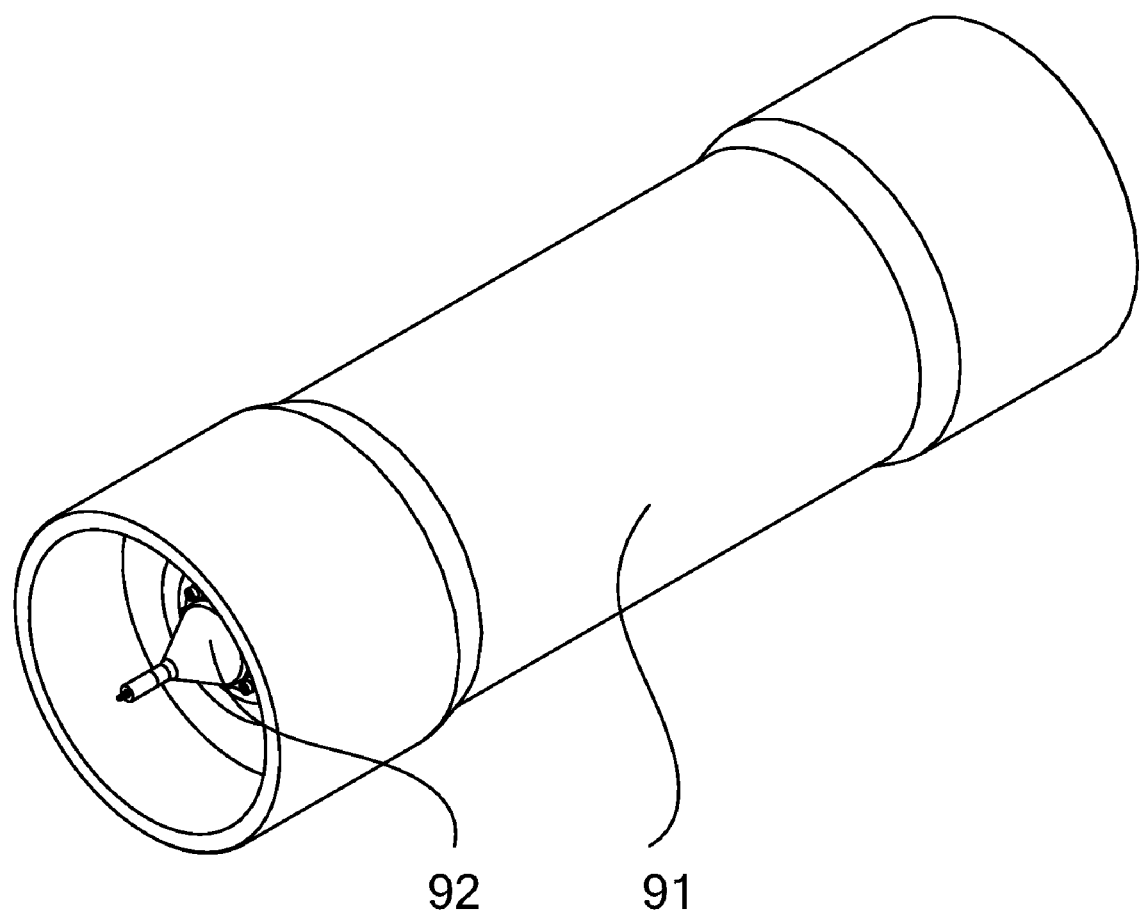
FIG. 10 is a schematic diagram depicting a structure of the sealed cabin according to an embodiment of the present invention.
Figure 11:
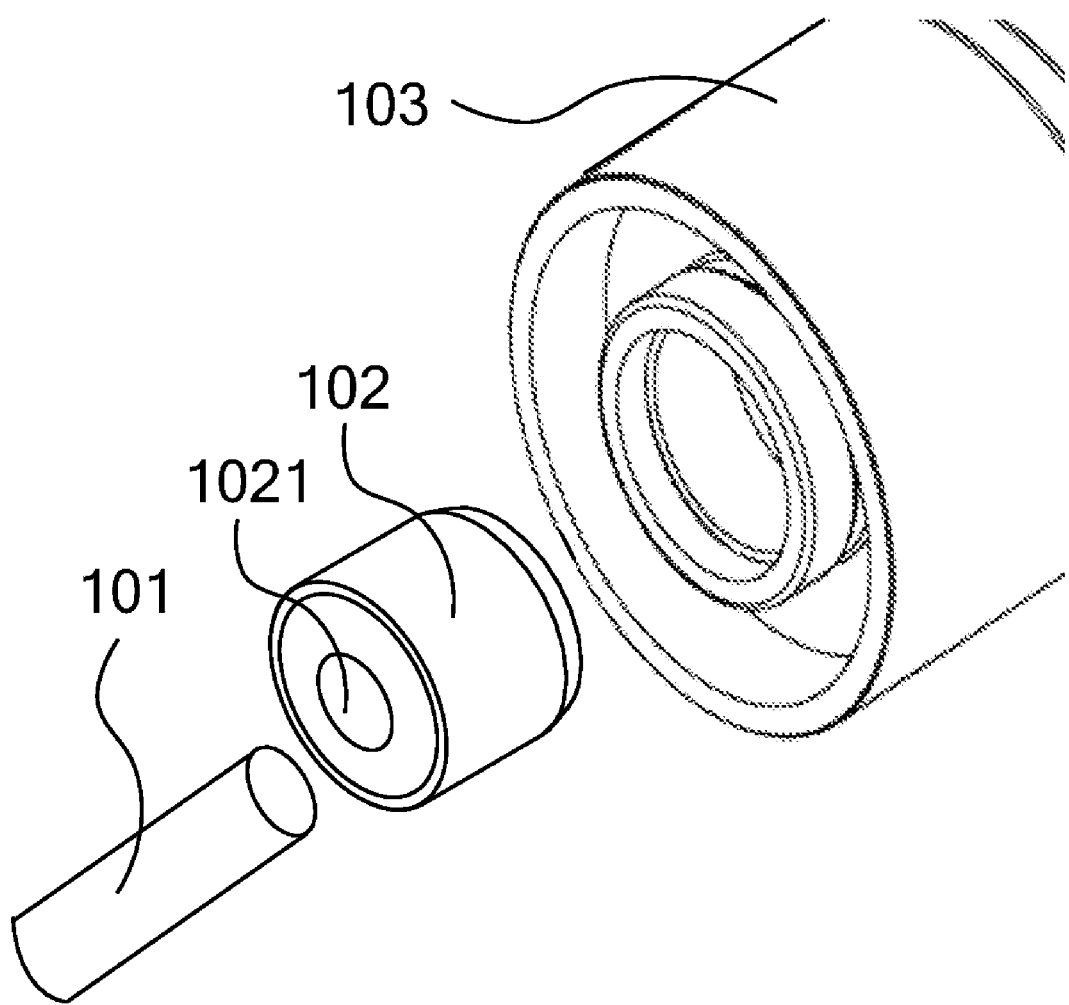
FIG. 11 is a schematic diagram showing assembly of an optical cable, a sealed optoelectronic isolation connection device, and a sealed cabin in the prior art.

FIG. 10 is a schematic diagram depicting a structure of the sealed cabin provided in the embodiment of the present invention. As shown in FIG. 10, the sealed cabin according to this embodiment includes a sealed cabin main body 91, and further includes a sealed optoelectronic isolation connection device 92. The sealed optoelectronic isolation connection device 92 in this embodiment may adopt the sealed optoelectronic isolation connection device provided in the present invention. The sealed optoelectronic isolation connection device 92 is fixed onto the sealed cabin 91.

Specifically, the specific structure of the sealed optoelectronic isolation connection device 92 in this embodiment can be seen in the embodiment of the sealed optoelectronic isolation connection device and FIGS. 1-8. Therefore, the details are not described herein. An electronic device is deployed in the sealed cabin main body 91 according to this embodiment. To enable the optical cable to securely connect to the electronic device in the sealed cabin main body 91 under a sealed condition, the opening of the sealed cabin main body 91 is sealed by the sealed optoelectronic isolation connection device, the optical cable passes through the sealed optoelectronic isolation connection device 92 and connects to the electronic device in the sealed cabin main body 91. The sealed optoelectronic isolation connection device 92 seals the optical cable and prevents water from entering into the sealed cabin main body 91.

The sealed cabin according to this embodiment seals each optical fiber of the optical cable by providing an optical fiber sealing device, and seals the conduit in the optical fiber using a conduit sealing device, thereby sealing the optical fibers and the conduit of the optical cable with the sealed optoelectronic isolation connection device. When the conduit of the optical cable breaks, as the optical fibers are sealed by the optical fiber sealing device, water will not enter along the optical fibers into the inner part of the sealed cabin sealed by the sealed optoelectronic isolation connection device. This effectively prevents the electronic device within the sealed cabin from being damaged. Therefore, the reliability of the sealed optoelectronic isolation connection device is enhanced.

Finally, it should be noted that the above embodiments are merely used for illustrating the technical solutions of the present invention, but not to limit the present invention. Though the present invention has been described in detail with reference to the foregoing embodiments, those of ordinary skill in the art should understand that modifications can still be made to the technical solutions as recited in foregoing embodiments, or equivalent replacements can be made to part of the technical features thereof. However, these modifications or replacement will not make the gist of corresponding technical solutions depart from the scope of each technical solution of the present invention.

What is claimed is:

1. A sealed optoelectronic isolation connection device, comprising:
    an insulation cylinder;
    a conduit sealing device;
    an optical fiber sealing device;
    the insulation cylinder is configured to insulate the conduit sealing device and the optical fiber sealing device;
    the conduit sealing device is provided with a conduit hole for accommodating a conduit of an optical cable and sealing the conduit;
    the optical fiber sealing device is provided with multiple optical fiber holes for accommodating optical fibers of the optical cable and sealing the optical fibers;
    the optical fiber sealing device and the conduit sealing device are inserted in sequence into the insulation cylinder and implement sealing together with the insulation cylinder;
    the optical fiber sealing device is electrically connected to the conduit sealing device; and
    the sealed optoelectronic isolation connection device further comprises an electrode lead, the electrode lead being fixed to an end of the optical fiber sealing device distant from the optical fiber holes, and being electrically connected to the optical fiber sealing device for transmission of electrical signals transmitted in the conduit.

2. The sealed optoelectronic isolation connection device according to claim 1, further comprising a base bushing, wherein the insulation cylinder is inserted into the base bushing and seals the base bushing.

3. The sealed optoelectronic isolation connection device according to claim 2, wherein the base bushing is provided with a first stepped hole;
    the insulation cylinder has a stepped structure and is provided with a second stepped hole, and the insulation cylinder is inserted into the first stepped hole;
    the optical fiber sealing device is a stepped cylinder, one end of which is provided with the optical fiber holes, and the other end of which is provided with a through hole, the through hole being interconnected with the optical fiber holes; and
    the conduit sealing device and the optical fiber sealing device are inserted in sequence into the second stepped hole.

4. The sealed optoelectronic isolation connection device according to claim 3, further comprising a curved protective casing, wherein the curved protective casing is inserted into the through hole, and is configured to enclose outer parts of the optical fibers passing through the optical fiber sealing device.

5. The sealed optoelectronic isolation connection device according to claim 2, further comprising a locking block, wherein the locking block is connected to the conduit sealing device via screw bolts and is configured to fix the conduit onto the conduit sealing device.

6. The sealed optoelectronic isolation connection device according to claim 2, further comprising a casted protection layer, wherein the casted protection layer is fixed onto an end of the base bushing close to the conduit sealing device, and is configured to seal the base bushing after the optical cable is inserted into the sealed optoelectronic isolation connection device.

7. The sealed optoelectronic isolation connection device according to claim 6, wherein a connection part between the base bushing and the casted protection layer are provided with multiple annular grooves; and the sealed optoelectronic isolation connection device further comprises an external pressure ring, which fixedly connects the casted protection layer and the base bushing in sequence via a screw bolt.

8. The sealed optoelectronic isolation connection device according to claim 2, wherein a sealing ring is provided between the optical fiber sealing device and the insulation cylinder, and a sealing ring is provided between the isolated cylinder and the base bushing;

an outer part of the base bushing is provided with multiple grooves for placing the sealing rings; or the optical fiber sealing device and the conduit sealing device are separately welded to the insulation cylinder, and the insulation cylinder is welded to the base bushing.

9. The sealed optoelectronic isolation connection device according to claim 2, wherein a sealing ring is provided between the optical fiber sealing device and the insulation cylinder, or a sealing ring is provided between the isolated cylinder and the base bushing;

an outer part of the base bushing is provided with multiple grooves for placing the sealing rings; or the optical fiber sealing device and the conduit sealing device are separately welded to the insulation cylinder, and the insulation cylinder is welded to the base bushing.

10. A sealed cabin, comprising a sealed cabin main body, further comprising the sealed optoelectronic isolation connection device according to any one of claim 1, wherein the sealed optoelectronic isolation connection device is fixed onto the sealed cabin main body.

* * * * *